Patented Jan. 10, 1950

2,494,059

UNITED STATES PATENT OFFICE 2,494,059

4,4'-DI-(SEC-ALKYLAMINO)-DIPHENYL-AMINES

Albert C. Ruggles, Kingsport, Tenn., assignor to Eastman Kodak Company, Rochester, N. Y., a corporation of New Jersey No Drawing. Application November 15, 1945,
Serial No. 628,958

6 Claims. (Cl. 260—576)

This invention relates to 4,4'-di-(sec-alkylamino)-diphenylamines, to a process for preparing the same and to motor fuels stabilized against gum formation therewith.

It is, accordingly, an object of my invention to provide 4,4'-di-(sec-alkylamino) diphenylamines. A further object is to provide a process for preparing such diphenylamine derivatives. A further object is to provide motor fuels stabilized against gum formation with such phenylenediamine derivatives. Other objects will become apparent hereinafter.

The 4,4'-di-(sec-alkylamino) diphenylamines of my invention can be represented by the following general formula:

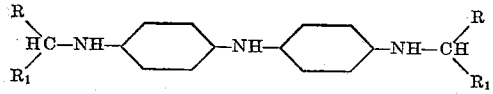

wherein R and $R_1$ each represents an alkyl group selected from the group consisting of methyl and ethyl groups except that R and $R_1$ are not both ethyl groups at the same time.

In accordance with my invention, I prepare the above formulated compounds by hydrogenating a mixture of 4,4'-dinitrodiphenylamine, 4-amino-4'-nitrodiphenylamine or 4,4'-diaminodiphenylamine and acetone or methyl ethyl ketone, in the presence of a hydrogenation catalyst which does not promote hydrogenation of the carbon to carbon double bonds in benzene nuclei. Typical of such hydrogenation catalysts are copper oxide chromium oxide hydrogenation catalysts, copper oxide-chromium oxide-barium oxide hydrogenation catalysts, etc. An intimate mixture of copper oxide, chromium oxide and barium oxide is advantageously employed as catalyst.

To prepare the preferred catalyst, the following procedure can be employed: a mixture of one mole of copper nitrate trihydrate, one mole of chromium nitrate pentadecahydrate and one-tenth mole of barium nitrate is dissolved in the minimum amount of water and carefully evaporated to dryness. The residue of intimately mixed nitrates is decomposed by heating gently to the lowest temperature at which decomposition of the nitrates to the corresponding oxides takes place, pains being taken to prevent a rise in temperature above a dull red heat. The lower the temperature of decomposition, the greater the activity of the catalyst, provided that undecomposed nitrates are removed from the catalyst before use. The nitrates can be conveniently removed by thorough washing with water. While, in general, a proportion of copper oxide: chromium oxide: barium oxide of 10:10:1 is preferred, other proportions can be used. The amount of this preferred catalyst employed is advantageously from aout 0.5 to about 10 per cent of the weight of the mixture of the nitro or aminodiphenylamine and ketone.

The molar ratio of ketone to nitro or aminodiphenylamine is advantageously more than 2:1 and is preferably between about 2:1 and about 10:1. The temperature employed is advantageously between about 100° and about 250° C. and is preferably between about 150° and about 200° C. The hydrogen pressure employed is advantageously between about 150 and about 3000 pounds per square inch and is preferably between about 500 and about 1800 pounds per square inch.

The following examples will serve to illustrate further the manner of practicing my invention:

*Example 1.—4,4'-di-(sec-butylamino) diphenylamine.*

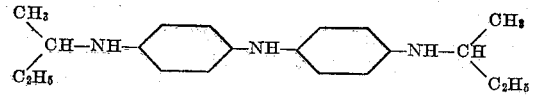

295 g. (1.1 moles) of 4,4'-dinitrodiphenylamine and 432 g. (6 moles) of methyl ethyl ketone were charged in a hydrogenation autoclave together with 40 g. of a hydrogenation catalyst comprising essentially an intimate mixture of copper oxide, chromium oxide and barium oxide. The mixture was heated, with agitation, to a temperature of 160 to 170° C. Hydrogen was then introduced into the autoclave until the pressure in the system reached 1500 pounds per square inch. After heating at 160 to 170° C., with agitation, for about 6 hours, the autoclave was allowed to cool and the contents were filtered to remove the catalyst. The excess methyl ethyl ketone was then removed from the filtrate by distillation and the residue distilled under vacuum. 289 g. (93 per cent yield) of 4,4'-di-(sec-butylamino) diphenylamine, boiling at 205° C. at 0.1 mm. of Hg pressure, were obtained. It had a specific gravity of 1.039.

*Example 2.—4,4'-diisopropylaminodiphenylamine*

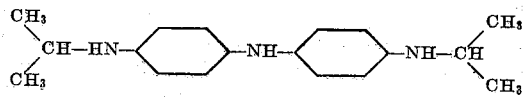

199 g. (1 mole) of 4,4'-diaminodiphenylamine, 448 g. (7.7 moles) of acetone and 18 g. of a hydrogenation catalyst comprising essentially an intimate mixture of copper oxide, chromium oxide and barium oxide. The mixture was heated with agitation, to from 160 to 170° C. Hydrogen gas was then introduced into the autoclave until the pressure in the system reached 1500 pounds per square inch. After heating at 160 to 170° C., with agitation, for about 6 hours, the autoclave was allowed to cool and the contents were filtered to remove the catalyst. The excess acetone was then removed from the filtrate by distillation and the residue was distilled under vacuum. 255 g. (90% yield) of 4,4'-diisopropylaminophenylamine, boiling at 185° C. at 0.1 mm. of Hg pressure, were obtained. It had a specific gravity of 1.0423.

I have found that hydrocarbon motor fuels stable to deterioration can be prepared by employing 4,4'-di-(sec-alkylamino)-diphenylamines. By the term "hydrocarbon motor fuel," I mean not only motor fuels consisting entirely of hydrocarbons, but also motor fuels containing hydrocarbons and appreciable amounts of other combustible materials, such as alcohols or ethers, for example.

It is well known that hydrocarbon motor fuels, such as cracked gasoline, have an undesirable tendency to undergo deterioration upon storage, with loss in such valuable properties as light color, low gum content and anti-knock value, the deterioration being due principally to oxidation and being accelerated by the photochemical action of light. Straight-run gasolines, on the other hand, do not ordinarily have the same undesirable tendency to deteriorate, although blended stocks containing straight-run gasoline and cracked gasoline usually show the undesirable tendency to deteriorate. Similarly other hydrocarbon products or distillates, useful as motor fuels, produced by cracking or destructive distillation of substances containing carbon and hydrogen, such as bituminous materials, e. g. coal, peat, lignite and the like, or hydrocarbon products produced by polymerization of unsaturated hydrocarbons, such as butenes, pentenes and the like, may show the aforesaid undesirable tendency to deteriorate.

I have found that deterioration in hydrocarbon motor fuels which normally, i. e. without stabilization, undergo deterioration, particularly deterioration characterized by gum formation, can be substantially inhibited or retarded by dispersing in the motor fuel one or more 4,4'-di-(sec-alkylamino)-diphenylamines.

Ordinarily, an amount of the diphenylamine derivative or derivatives sufficient to give a concentration of from about 0.001 per cent to about 0.1 per cent (by weight) of the derivative or derivatives in the motor fuel will suffice to give a motor fuel with suitable stability against deterioration. The quantity of any one of the diphenylamine derivatives which is actually employed will depend upon the nature of the motor fuel being stabilized and the conditions under which the fuel is stored.

The tendency of a motor fuel to form gum can be determined, among other methods by an accelerated oxidation test, the test described by Egloff, Morrell, Lowry and Dryer in Ind. Eng. Chem. 24, 1375-1378 (1932) is very satisfactory and is widely used in this accelerated oxidation test. A sample of the motor fuel being tested, in an open 8 ounce bottle, is placed in a suitable metal bomb surrounded by a water bath. Oxygen is introduced to 100 pounds per square inch, (7 kg. per square centimeter) pressure. The bath is then heated to 100° C. As the temperature increases, the pressure rises, reaches a maximum and continues near this maximum for a shorter or longer period of time. The test is continued for 4 hours or until a drop in pressure is noted. The period slightly before the attainment of maximum pressure (approximately 15 minutes from the beginning of heating) until more than a slight drop in pressure takes place (usually a sharp break in the pressure curve occurs) is recorded as the induction period.

An induction period of less than 75 minutes is usually indicative of very low stability, while an induction period of 300 or more minutes, for freshly made motor fuels, represents a fuel possessing suitable stability for from 6 to 12 months storage in the northern half of the United States. For more southern and warmer climates, the induction period should be increased somewhat for satisfactory bulk storage of about a year's duration.

The diphenylamine derivatives of my invention can be employed to retard gum formation in hydrocarbon motor fuels which tend to undergo deterioration whether or not the motor fuels contain small or large amounts of addition agents such as tetra-alkyl lead compounds. It is, of course, known that tetra-alkyl lead compounds, such as tetra-ethyl lead are added to hydrocarbon motor fuels to improve the anti-knock rating of the motor fuels. In some cases, only a relatively small amount of the tetra-alkyl lead compound is added, but sometimes with certain aviation grades of gasoline, a larger amount is used, such as aviation gasoline having an octane number above 80 comprising essentially non-gum forming hydrocarbon fuel containing less than one per cent by volume of olefinic or diolefinic hydrocarbons. Motor fuels having a relatively large amount of tetra-alkyl lead or other tetra-alkyl lead compounds are usually referred to as "heavily leaded" gasoline.

The diphenylamine derivatives of my invention can be employed not only in all types of "leaded" gasolines, but can, if desired, be added to the "ethyl fluid" itself. "Ethyl fluid" usually is a solution containing a mixture of a tetra-alkyl lead compound and a halogenated hydrocarbon, such as ethylene dibromide or ethylene dichloride, or both. The diphenylamine derivatives serve to retard the formation of haze in "ethyl fluid" or in hydrocarbon motor fuels containing "ethyl fluid," whether the hydrocarbon motor fuel is one which forms gum upon storage, or is one which is composed essentially of non-gum-forming hydrocarbons.

The efficacy of the diphenylamine derivatives of my invention as inhibitors or retardants of the deterioration of motor fuels is shown in the following table:

*Table*

| Inhibitor | Concentration | Induction Period |
|---|---|---|
| | *Percent by weight* | *Minutes* |
| none | | 45 |
| 2,4'-di-(sec-butylamino)diphenylamine | 0.01 | 490 |
| 4,4'-diisopropylaminodiphenylamine | 0.01 | 495 |

The diphenylamine derivatives of my invention are also useful as rubber antioxidants to retard the aging of rubber.

What I claim as my invention and desire to be secured by Letters Patent of the United States is:

1. A 4,4'-di-(sec-alkylamino) diphenylamine selected from the group consisting of 4,4'-diisopropylaminodiphenylamine and 4,4'-di-(sec-butylamino) diphenylamine.

2. 4,4'-diisopropylaminodiphenylamine.

3. 4,4'-di-(sec-butylamino)diphenylamine.

4. A process for preparing a 4,4'-di-(sec-alkylamino)-diphenylamine comprising hydrogenating a mixture of a diphenylamine derivative selected from the group consisting of 4,4'-dinitrodiphenylamine, 4-amino-4'-nitrodiphenylamine and 4,4'-diamino-diphenylamine, and a ketone selected from the group consisting of acetone and methyl ethyl ketone, in the presence of a hydrogenation catalyst consisting essentially of a mixture of copper oxide, chromium oxide and barium oxide, at a temperature of from about 150° to about 200° C. and a pressure of from about 500 to about 1800 pounds per square inch.

5. A process for preparing 4,4'-diisopropylaminodiphenylamine comprising hydrogenating a mixture of 4,4'-diaminodiphenylamine and acetone, in the presence of a hydrogenation catalyst consisting essentially of a mixture of copper oxide, chromium oxide and barium oxide, at a temperature of from about 150° to about 200° C. and a pressure of from about 500 to about 1800 pounds per square inch.

6. A process for preparing 4,4'-di-(sec-butylamino)-diphenylamine comprising hydrogenating a mixture of 4,4'-dinitrodiphenylamine and methyl ethyl ketone, in the presence of a hydrogenation catalyst consisting essentially of a mixture of copper oxide, chromium oxide and barium oxide, at a temperature of from about 150° to about 200° C. and a pressure of from about 500 to about 1800 pounds per square inch.

ALBERT C. RUGGLES.

REFERENCES CITED

The following references are of record in the file of this patent:

UNITED STATES PATENTS

| Number | Name | Date |
|---|---|---|
| 1,950,478 | Calcott et al. | Mar. 13, 1934 |
| 2,022,889 | Laner | Dec. 3, 1935 |
| 2,166,971 | Schmidt et al. | July 25, 1939 |
| 2,276,957 | Gibbons | May 17, 1942 |
| 2,348,290 | Gilbert | May 9, 1944 |